US012729699B2

(12) United States Patent
Olson et al.

(10) Patent No.: US 12,729,699 B2
(45) Date of Patent: Sep. 8, 2026

(54) WORK MACHINE ACCESSORY MOTOR LOAD PROTECTION

(71) Applicant: Caterpillar Inc., Peoria, IL (US)

(72) Inventors: Andrew J. Olson, Vail, AZ (US); Luc Anani Agbekodo, San Tan Valley, AZ (US); David W. Engelhardt, Tucson, AZ (US); Steven C. Budde, Dunlap, IL (US); Michael D. Hudson, Tucson, AZ (US); John J. Krone, Peoria, IL (US); Cameron T. Lane, Oro Valley, AZ (US); Karl P. Schneider, Decatur, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 19/226,311

(22) Filed: Jun. 3, 2025

(65) Prior Publication Data

US 2025/0376995 A1 Dec. 11, 2025

Related U.S. Application Data

(60) Provisional application No. 63/657,762, filed on Jun. 7, 2024.

(51) Int. Cl.
*F15B 11/17* (2006.01)
*E02F 9/20* (2006.01)
(Continued)

(52) U.S. Cl.
CPC .............. *F15B 11/17* (2013.01); *E02F 9/207* (2013.01); *E02F 9/2228* (2013.01);
(Continued)

(58) Field of Classification Search
CPC ........ F15B 1/033; F15B 11/17; F15B 21/087; F15B 2201/51; F15B 2211/20515;
(Continued)

(56) References Cited

U.S. PATENT DOCUMENTS 6,989,640 B2 * 1/2006 Yoshimatsu .......... E02F 9/2292 318/140
7,076,947 B2 * 7/2006 Ariga ...................... F15B 11/17 60/452
(Continued)

FOREIGN PATENT DOCUMENTS

CN 109412242 3/2019
CN 110588425 12/2019
(Continued)

*Primary Examiner* — Michael Leslie

(57) ABSTRACT

A work machine includes a first hydraulic circuit, a second hydraulic circuit, a single electric motor, and a controller. The first hydraulic circuit includes a first pump and a first valve. The first pump is configured to drive a first group of hydraulic accessories. The second hydraulic circuit includes a second pump and a variable pressure valve. The second pump is configured to drive a second group of hydraulic accessories. The single electric motor is connected/configured to drive the first pump and the second pump. The controller configured to estimate a torque of the second pump, estimate a total torque of the motor as a sum of a current operating torque of the motor and the estimate of the torque of the second pump, and, on condition the total torque of the motor is greater than a threshold torque, lower an operating torque of at least one of the first pump or the second pump.

20 Claims, 3 Drawing Sheets

(51) Int. Cl.
*E02F 9/22* (2006.01)
*F15B 1/033* (2006.01)
*F15B 21/08* (2006.01)
*B60P 1/16* (2006.01)

(52) U.S. Cl.
CPC .......... *E02F 9/2292* (2013.01); *F15B 21/087* (2013.01); *B60P 1/162* (2013.01); *F15B 1/033* (2013.01); *F15B 2201/51* (2013.01); *F15B 2211/20515* (2013.01); *F15B 2211/20576* (2013.01); *F15B 2211/212* (2013.01); *F15B 2211/50536* (2013.01); *F15B 2211/6306* (2013.01); *F15B 2211/6309* (2013.01)

(58) Field of Classification Search
CPC ...... F15B 2211/20576; F15B 2211/212; F15B 2211/6652; E02F 9/207; E02F 9/2228; E02F 9/2246; E02F 9/2292; B60P 1/162
See application file for complete search history.

(56) References Cited

U.S. PATENT DOCUMENTS

| | | | | |
|---|---|---|---|---|
| 8,720,197 | B2 | 5/2014 | Persson et al. | |
| 8,978,800 | B2 | 3/2015 | Soma'et al. | |
| 9,976,283 | B2 * | 5/2018 | Tsuruga | E02F 9/2267 |
| 10,060,451 | B2 * | 8/2018 | Takahashi | E02F 9/2296 |
| 10,215,198 | B2 * | 2/2019 | Takahashi | E02F 9/2228 |
| 10,523,040 | B2 | 12/2019 | Kosiba et al. | |
| 10,744,883 | B2 | 8/2020 | Quattrini, Jr. et al. | |
| 10,759,285 | B2 | 9/2020 | Tanaka et al. | |
| 11,198,377 | B2 | 12/2021 | Hiratsuka | |
| 11,554,683 | B2 | 1/2023 | Cashdollar et al. | |
| 2017/0117726 | A1 | 4/2017 | Jore et al. | |
| 2022/0069603 | A1 | 3/2022 | Williams et al. | |
| 2023/0182574 | A1 | 6/2023 | De Caen et al. | |
| 2023/0339357 | A1 | 10/2023 | Chaykowsky et al. | |
| 2024/0042888 | A1 | 2/2024 | Goswami et al. | |
| 2024/0109454 | A1 | 4/2024 | Bennett | |

FOREIGN PATENT DOCUMENTS

| | | | | |
|---|---|---|---|---|
| CN | 116729231 | | 9/2023 | |
| EP | 4335982 | A1 * | 3/2024 | E02F 9/2246 |
| JP | 2009201276 | | 9/2009 | |
| KR | 20220095751 | | 7/2022 | |
| WO | 2017114374 | | 7/2017 | |
| WO | 2019104375 | | 6/2019 | |
| WO | 2020202438 | | 10/2020 | |
| WO | 2024019531 | | 1/2024 | |

* cited by examiner

WORK MACHINE ACCESSORY MOTOR LOAD PROTECTION

TECHNICAL FIELD

This disclosure relates generally, but not by way of limitation, to load protection for accessory electric motors of work machines.

BACKGROUND

Battery electric vehicles are a type of electric vehicle that rely solely on electric power stored in a battery module to propel and operate the machine. Hybrid vehicles combine internal combustion engines with electric motors. In both cases, the vehicles utilize electric motors powered by high-capacity battery modules, which provide the necessary energy to power various aspects of vehicle operation, for example to drive the vehicle's traction system.

In some cases, electric motors of such vehicles are employed to drive accessory systems, e.g. implements of work machines. Efficient use of the electric motor drive without overloading the motor can be a challenge in such applications.

U.S. Pat. No. 8,720,197, entitled "FLOW MANAGEMENT SYSTEM FOR HYDRAULIC WORK MACHINE" discloses a flow management system capable of providing adjustable hydraulic fluid flow or pressure at a common line to supply bidirectional pumps in electro-hydrostatic actuation systems and conditioning re-circulated hydraulic fluid.

SUMMARY

In an example, a work machine includes a first hydraulic circuit, a second hydraulic circuit, a single electric motor, and a controller. The first hydraulic circuit includes a first pump and a first valve. The first pump is configured to drive a first group of one or more hydraulic accessories. The second hydraulic circuit includes a second pump and a variable pressure valve. The second pump is configured to drive a second group of one or more hydraulic accessories. The single electric motor is connected and configured to drive the first pump and the second pump. The controller configured to estimate a torque of the second pump, estimate a total torque of the motor as a sum of a current operating torque of the motor and the estimate of the torque of the second pump, and, on condition the total torque of the motor is greater than a threshold torque, lower an operating torque of at least one of the first pump or the second pump.

In an example, a method includes driving a first group of one or more hydraulic accessories of a work machine with a first pump operatively connected to an electric motor, driving a second group of one or more hydraulic accessories of the work machine with a second pump operatively connected to the motor, estimating a torque of the second pump, estimating a total torque of the motor as a sum of a current operating torque of the motor and the estimate of the torque of the second pump, and, on condition the total torque of the motor is greater than a threshold torque, lowering an operating torque of at least one of the first pump or the second pump.

In an example, a work machine a first hydraulic circuit, a second hydraulic circuit, an electric motor, and a controller. The first hydraulic circuit includes a first pump configured to drive a first group of one or more hydraulic accessories of the work machine. The second hydraulic circuit includes a second pump configured to drive a second group of one or more hydraulic accessories of the work machine. The electric motor is operatively connected and configured to drive the first pump and the second pump. The controller is configured to estimate a total torque of the motor, compare the total torque to a threshold torque, and, on condition the total torque is greater than the threshold torque, lower an operating torque of at least one of the first pump or the second pump.

These and other examples and features of the present devices, systems, and methods will be set forth in part in the following Detailed Description. This overview is intended to provide a summary of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
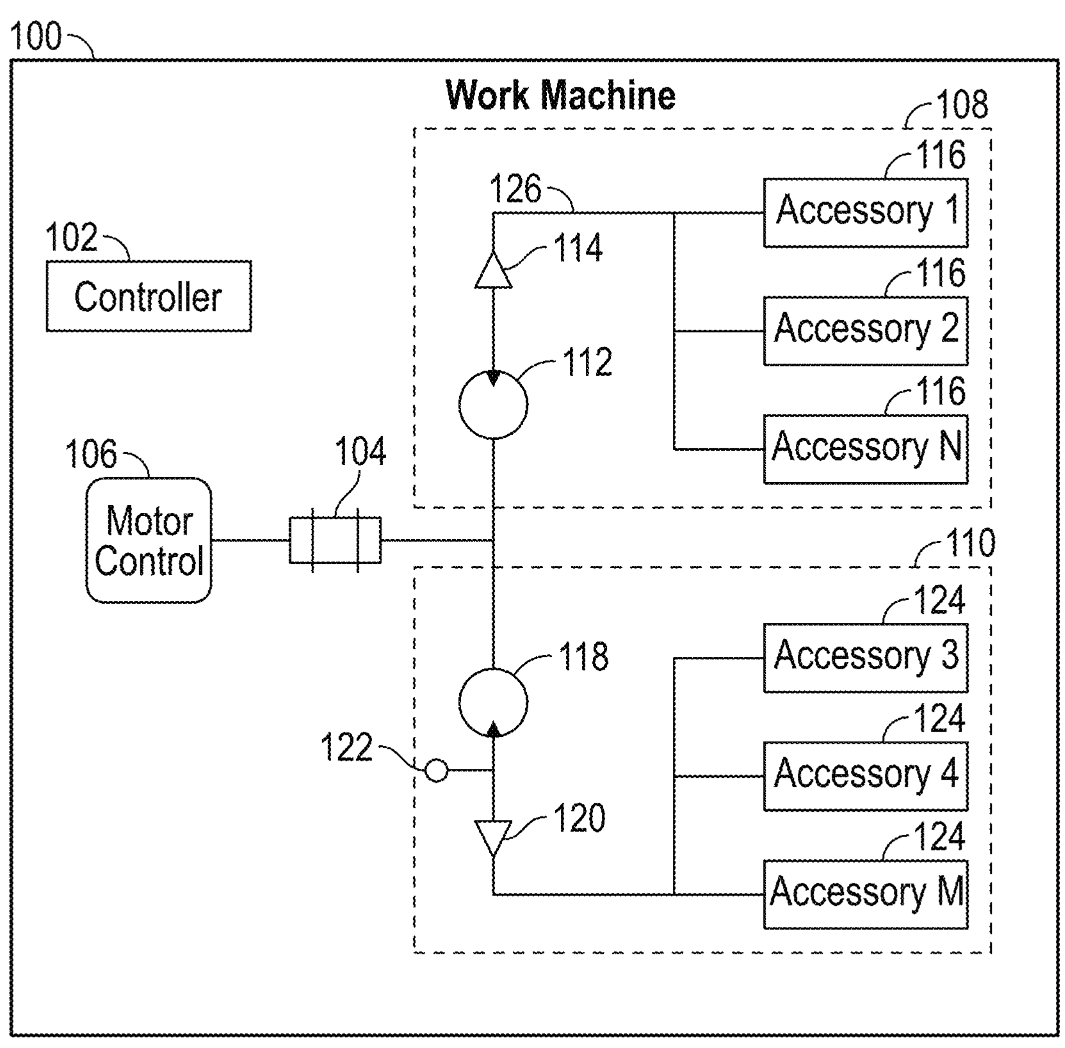
FIG. 1 is a block diagram depicting an example work machine in accordance with this disclosure.

FIG. 1 is a block diagram depicting example work machine 100. Work machine 100 can include a variety of types of work machines powered wholly or in part by electrical power via a plurality of batteries. For example, work machine 100 can include work machines related to various industries, including, as examples, construction, agriculture, forestry, transportation, material handling, waste management, and so on. Work machine 100 can include, for example, a paving machine, cold planer, wheel loader, grader, scraper, dozer, excavator, compactor, material haulers like dump trucks, along with other example machine types.

Example work machine 100 includes controller 102, motor 104, motor controller 106, first hydraulic circuit 108, and second hydraulic circuit 110. First hydraulic circuit 108 includes first pump 112, first valve 114, and a first group of one or more hydraulic accessories 116. Second hydraulic circuit 110 includes second pump 118, second valve 120, pressure sensor 122, and second group of one or more hydraulic accessories 124. Accessories 116 and 124 can be any accessory or sub-system of work machine 100. For example, accessories 116 and 124 can include hoist cylinders for an articulating bed of a material hauler, steering, braking, thermal management (e.g. brake cooling) systems, as examples.

Controller 102 can be communicatively connected to motor controller 106, as well as pressure sensor 122. Controller 102 can be, for example, an electronic control unit (ECU) of work machine 100 and can be configured to store data and execute programs to carry out functions attributed to the controller, including, e.g., modulating the torque of one or both of first pump 112 and second pump 118 to prevent overloading motor 104.

Motor controller 106 is communicatively connected to motor 104. Motor 104 can be a variety of different types of electric motors and can be connected to and powered by various power sources, including one or more batteries on-board work machine 100. Motor controller 106 is configured to control operations of motor 104 and can be configured to execute closed loop control of the motor based on various parameters, including motor speed, current, voltage, torque, as examples.

Motor 104 is operatively connected to first pump 112 and second pump 118. Motor 104 drives first pump 112, which, in turn drives first group of accessories 116 of first hydraulic circuit 108. Similarly, motor 104 drives second pump 118, which, in turn drives second group of accessories 124 of second hydraulic circuit 110. In examples according to this disclosure, a maximum torque capability of motor 104 may be less than a sum of a first torque required by first pump 112 to drive first group of accessories 116 and a second torque required by second pump 118 to drive second group of accessories 124.

In examples according to this disclosure, controller 102 is configured to modulate the torque of one or both of first pump 112 and second pump 118 to prevent overloading motor 104. In an example, controller 102 is configured to determine a total torque of motor 104, compare the total torque of the motor to a threshold torque, and, on condition the total torque is greater than the threshold torque, lower an operating torque of at least one of the first pump or the second pump. The threshold torque can be a predetermined torque limit based on the operating capabilities of motor 104. The threshold torque can be, for example, less than or equal to a maximum torque capability of motor 104. In examples, the threshold torque can be less than the rated torque of motor 104. In an example, the threshold torque is in a range from approximately 80% to approximately 95% of a maximum torque capability of motor 104. In an example, the threshold torque is in a range from approximately 80% to approximately 90% of a maximum torque capability of motor 104. In an example, the threshold torque is approximately 90% of a maximum torque capability of motor 104.

Controller 102 can determine the operating torque of motor 104 by, for example, communicating with motor controller 106 and receiving signals indicating the current operating torque of the motor. Additionally, controller 102 may estimate the torque of second pump 118 and estimate the total torque of motor 104 as a sum of the estimate of the torque of second pump 118 and a current operating torque of the motor, which may be equal to or indicative of the torque of first pump 112.

On condition the total torque of motor 104 is greater than the threshold torque, controller 102 can lower an operating torque of second pump 118 to reduce the risk of or prevent overloading of the motor. In an example, second valve 120 is a variable pressure valve. Additionally, in an example, second pump 118 is a variable displacement pump. Controller 102 can lower the operating torque of second pump 118 by, for example, modulating the displacement of second pump 118 and/or actuating second valve 120 to lower the pressure of second hydraulic circuit 110, thereby lowering the torque on motor 104.

On condition the total torque of motor 104 is greater than the threshold torque, controller 102 can lower an operating torque of first pump 112 to reduce the risk of or prevent overloading of the motor. In an example, controller 102 can actuate first valve 114 to close branch 126 of first hydraulic circuit 108 between first valve 114 and first group of accessories 116 and lower the pressure of first hydraulic circuit 108 to zero or a very low nominal pressure, which, in turn, will significantly lower the operating torque of first pump 112, thereby lowering the torque on motor 104.

Figure 2:
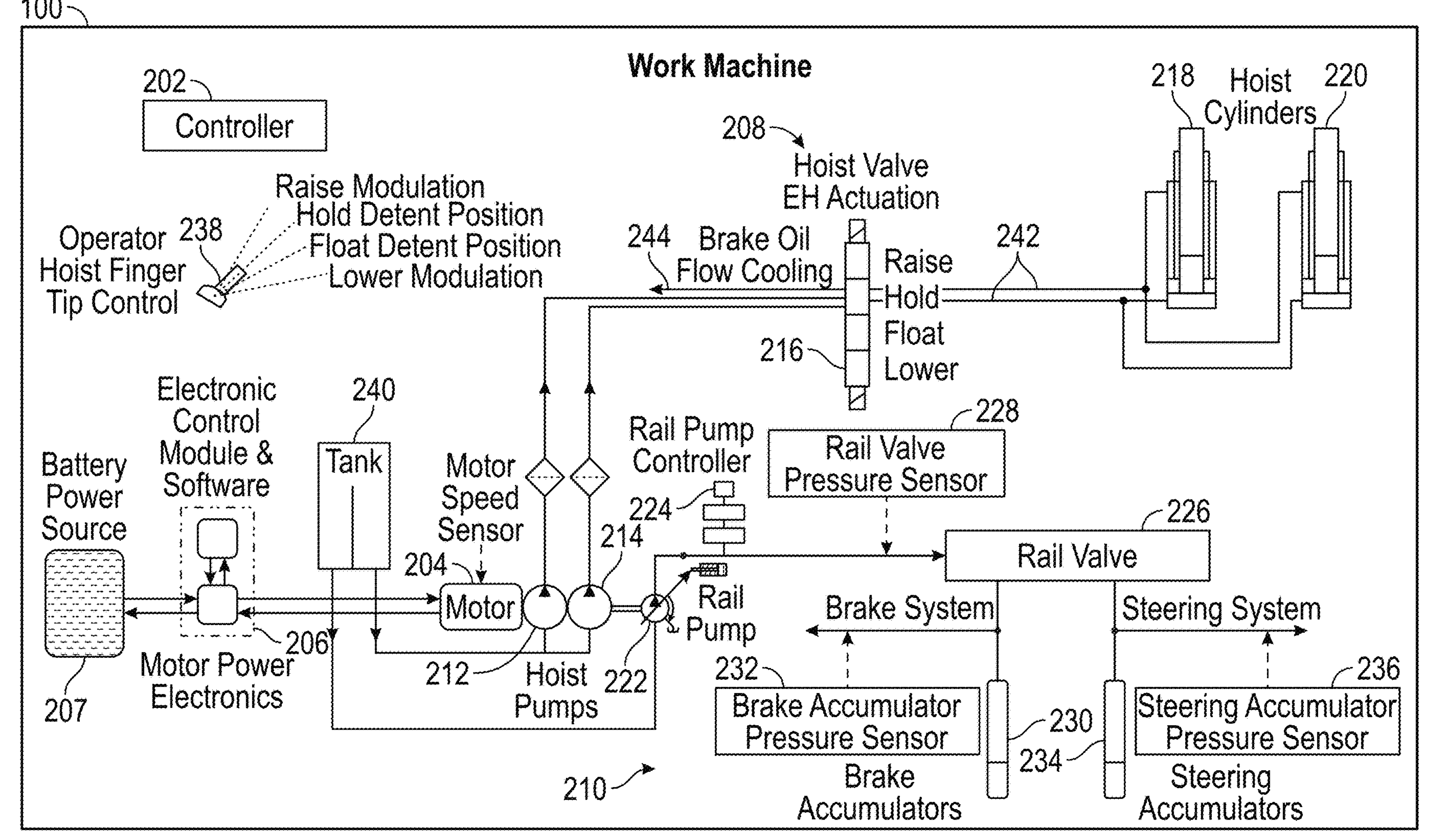
FIG. 2 is a block diagram depicting another example work machine in accordance with this disclosure.

FIG. 2 is a block diagram depicting example work machine 200, which is a material hauler with an articulating bed driven by a pair of hoist cylinders. Work machine 200 includes controller 202, motor 204, motor controller 206, power source 207, first hydraulic circuit 208, and second hydraulic circuit 210. First hydraulic circuit 210 includes a pair of hoist pumps 212, 214, hoist valve 216, and a pair of hoist cylinders 218, 220, which are respectively associated with and fluidically connected to hoist pumps 212, 214. Second hydraulic circuit 210 includes rail pump 222, rail pump control 224, rail valve 226, rail valve pressure sensor 228, brake accumulator 230, brake accumulator pressure sensor 232, steering accumulator 234, and steering accumulator pressure sensor 236. Work machine 100 also includes operator input control 238 and hydraulic fluid reservoir/tank 240.

Input control 238 can be configured to receive operator input, e.g. in selectable positions like raise, hold, float, and lower, which correspond to raise, hold, float, and lower states of hoist valve. Input control 238 via operator selection of one of the available states is configured to control actuation of hoist cylinders 218, 220, which, in turn, drive an articulating bed of the work machine. In examples, input control 238 can be a hand or finger operated joystick or toggle switch, or other types of input controls, e.g., a dial control.

Controller 202 can be communicatively connected to motor controller 206, rail pump controller 224, rail valve 226, rail valve pressure sensor 228, brake accumulator pressure sensor 232, and steering accumulator pressure sensor 236. Controller 202 can be, for example, an electronic control unit (ECU) of work machine 200 and can be configured to store data and execute programs to carry out functions attributed to the controller, including, e.g., modulating the torque of one or more of hoist pumps 212, 214, and rail pump 222 to prevent overloading motor 204.

Motor controller 206 is communicatively connected to motor 204. Motor 204 can be a variety of different types of electric motors and is connected to and powered by power source 207. Power source 207 can be include various types of electrical power sources, including one or more batteries on-board work machine 200. Motor controller 206 is configured to control operations of motor 204 and can be configured to execute closed loop control of the motor based on various parameters, including motor speed, current, voltage, and torque, as examples.

Motor 204 is operatively connected to hoist pumps 212, 214, and rail pump 222. In the example of FIG. 2, there is a direct drive between motor 204 and hoist pumps 212, 214, and rail pump 222. Motor 204 drives hoist pumps 212, 214, which, in turn drive hoist cylinders 218, 220 of first hydraulic circuit 208. Similarly, motor 204 drives rail pump 222 to charge brake accumulator 230 and steering accumulator 234 of second hydraulic circuit 210.

Brake accumulator 230 and steering accumulator 234 are used to store and release energy in the form of pressurized fluid in second hydraulic circuit 210. Accumulators can perform different functions in hydraulic systems. In the case of example work machine 200, brake accumulator 230 and steering accumulator 234 release stored energy back into second hydraulic circuit 210, in the event of a pressure drop below a set point and thus provide temporary hydraulic power to the machine brake and steering systems without the need for rail pump 222. Brake accumulator 230 and steering accumulator 234 can be a variety of different types of hydraulic accumulators, including, e.g., bladder or diaphragm, piston, and spring-loaded accumulators.

Brake accumulator pressure sensor 232 and steering accumulator pressure sensor 236 are respectively associated with and configured to measure the pressure of brake accumulator 230 and steering accumulator 234. Brake accumulator pressure sensor 232 and steering accumulator pressure sensor 236 are configured to monitor the pressures of brake accumulator 230 and steering accumulator 234 such that controller 202 can maintain the accumulator pressures at or above a low-pressure threshold. The low-pressure threshold can be set to different values depending upon the requirements of the system, e.g., depending upon the pressure required to drive the brake and steering systems of machine 200. For example, the brake accumulator low-pressure threshold can be a value below which brake accumulator 230 will be unable to drive the brake system of machine 200. Similarly, the steering accumulator low-pressure threshold can be a value below which steering accumulator 234 will be unable to drive the steering system of machine 200.

First hydraulic circuit 210 includes hoist pumps 212, 214, hoist valve 216, and hoist cylinders 218, 220, which are respectively associated with and fluidically connected to hoist pumps 212, 214. In examples, hoist pumps 212, 214 are fixed displacement pumps. In examples, hoist valve 216 controls hydraulic fluid flow from hoist pumps 212, 214 to either hoist cylinders 218, 220, or a low-pressure accessory, e.g. brake oil cooling system of machine 200. Hoist valve 216 can have a plurality of states, each of which controls hydraulic fluid flow through second hydraulic circuit 208. In examples, hoist valve 216 includes raise, hold, float, and lower states, which can be controllably selected by controller 202. As noted above, the raise, hold, float, and lower states of hoist valve 216 correspond to raise, hold, float, and lower input controls receivable from an operator of work machine via input control 238.

In the example of FIG. 2, at least the raise and lower states, and, in some cases the float state of hoist valve 216 will require a relatively high pressure in first hydraulic circuit 208, which, in turn will put a relatively high torque on hoist pumps 212, 214. The hold state of hoist valve 216, on the other hand, will close high-pressure branches 242 of first hydraulic circuit 108 between hoist valve 216 and hoist cylinders 218, 220 and lower the pressure of first hydraulic circuit 208 to zero or a very low nominal pressure, which, in turn, will significantly lower the operating torque of hoist pumps 212, 214. The hold state of hoist valve 216 closes branches 242 of first hydraulic circuit 108 between hoist valve 216 and hoist cylinders 218, 220 and opens low-pressure branch 244, which diverts fluid flow to a tank or a cooling system, e.g. a low-pressure brake oil cooling system of machine 200.

In addition to accumulators and associated pressure sensors, second hydraulic circuit 210 includes rail pump 222, rail pump control 224, rail valve 226, and rail valve pressure sensor 228. In examples, rail pump 222 can be a variable displacement pump and rail valve 226 is a variable pressure solenoid valve. Rail pump 222 is configured to drive to a selectable/controllable pressure set point. For example, rail pump 222 drives to a pressure set point by varying displacement until it reaches the pressure set point and then destroking and maintaining pressure. Rail valve 226 can be used to vary pressure set point for second hydraulic circuit 210. For example, rail pump control 224 in coordination with controller 202 can be configured to actuate rail valve 226 to raise or lower the pressure set point of second hydraulic circuit 210.

Thus, the contribution of rail pump 222/second hydraulic circuit 210 to load on motor 204 can be derated by lowering the pressure set point. For example, rail pump control 224 in coordination with controller 202 can be configured to actuate rail valve 226 to lower the pressure set point of second hydraulic circuit 210. The lower pressure set point will, in turn, lower the operating torque of rail pump 222. And lowering the operating torque of rail pump 222 directly lowers the total torque load of motor 204.

In examples according to this disclosure, controller 202 is configured to modulate the torque of one or more of hoist pumps 212, 214, and rail pump 222 to prevent overloading motor 204. In an example, controller 202 is configured to determine a total torque of motor 204, compare the total torque of the motor to a threshold torque, and, on condition the total torque is greater than the threshold torque, lower an operating torque of at least one of hoist pumps 212, 214, and rail pump 222. The threshold torque can be a predetermined torque limit based on the operating capabilities of motor 204. The threshold torque can be, for example, less than or equal to a maximum torque capability of motor 204. In examples, the threshold torque can be less than the rated torque of motor 204. In an example, the threshold torque is in a range from approximately 80% to approximately 95% of a maximum torque capability of motor 204. In an example, the threshold torque is in a range from approximately 80% to approximately 90% of a maximum torque capability of motor 204. In an example, the threshold torque is approximately 90% of a maximum torque capability of motor 204.

In examples according to this disclosure, a maximum torque capability of motor 204 may be less than a sum of a first torque required by hoist pump 212 to drive hoist cylinder 218, a second torque required by hoist pump 214 to drive hoist cylinder 220, and a third torque required by rail pump 222 to drive machine brake and steering systems or to charge brake accumulator 230 and steering accumulator 234. In other words, motor 204 may be selected such that the motor cannot meet the full load of the accessories of both first hydraulic circuit 208 and the accessories of second hydraulic circuit 210, necessitating load protection control by controller 202 in coordination with motor controller 206 and rail pump control 224.

In the example of FIG. 2, there is no pressure sensing or other pressure feedback signals in first hydraulic circuit 208. Additionally, hoist valve 216 is not a variable pressure valve, and can only indirectly modulate pressure by actuation into one of the different states of the valve. The pressure of first hydraulic circuit 208 and by extension the torque on fixed displacement hoist pumps 212, 214 is generally fixed by the state of hoist valve 216, which may be binary setting either a relatively high fixed pressure and high pump torque or a relatively low or nominal fixed pressure and pump torque. Moreover, because there is no pressure or other sensing signal feedback to controller 202 or another controller, the torque of hoist pumps 212, 214 can only be inferred from the state of hoist valve 216 and the operating torque of motor 204.

In examples, controller 202 is configured to estimate a torque of rail pump 222, determine a current operating torque of motor 204, and estimate a total torque of motor 204 as a sum of the estimate of the torque of rail pump 222 and the current operating torque of motor 204 (which can be indicative of the torque of hoist pumps 212, 214). Controller 202 can estimate the torque of rail pump 222 as a function of the displacement of the pump and the pressure in second hydraulic circuit 210. In examples, controller 202 is monitoring pressure in second hydraulic circuit 210 by receiving signals indicative of valve and accumulator pressures from rail valve pressure sensor 228, brake accumulator pressure sensor 232, and steering accumulator pressure sensor 236.

Although torque of rail pump 222 can generally be a function of pump displacement and pressure, the actual torque on the pump may also depend on other factors including pump efficiency factors, hydraulic fluid characteristics, e.g. viscosity, and shaft speed. In examples, controller 202 receives pressure sensor signals from one or more of rail valve pressure sensor 228, brake accumulator pressure sensor 232, and steering accumulator pressure sensor 236 and, along with known pump displacement uses a model or map that includes other relevant characteristics to estimate the torque of rail pump 222. For example, controller 202 can reference a look-up table for rail pump 222 and second hydraulic circuit 210 stored in memory of controller 202 or another component and pressure sensor signals from one or more of rail valve pressure sensor 228, brake accumulator pressure sensor 232, and steering accumulator pressure sensor 236 to estimate the torque of rail pump.

Controller 202 can determine the operating torque of motor 204 by, for example, communicating with motor controller 206 and receiving signals indicating the current operating torque of the motor. Controller 102 can then estimate the total torque of motor 204 as a sum of the estimate of the torque of rail pump 222 and the current operating torque of motor 204, which can be equal to or indicative of the torque of hoist pumps 212, 214.

On condition the total torque of motor 204 is greater than the threshold torque, controller 202 can lower an operating torque of hoist pumps 212, 214 to reduce the risk of or prevent overloading of motor 204. In an example, controller 202 can actuate hoist valve 216 to close high-pressure branches 242 of first hydraulic circuit 208 between hoist valve 216 and hoist cylinders 218, 220 and lower the pressure of first hydraulic circuit 208 to zero or a very low nominal pressure, which, in turn, will significantly lower the operating torque of hoist pumps 212, 214. In an example, controller 202 can actuate hoist valve 216 to the hold state. In the hold state, hoist valve 216 closes branches 242 of first hydraulic circuit 208 between hoist valve 216 and hoist cylinders 218, 220, which maintains the pressure of and holds hoist cylinders 218, 220 (and associated material load in the articulating bed of material hauler work machine 200) in the current position. Additionally, in the hold state, hoist valve 216 opens low-pressure branch 244 of first hydraulic circuit 208, thereby diverting hydraulic fluid flow to a brake oil cooling system of work machine 200, which pressure load is significantly lower than the load generated by hoist cylinders 218, 220 with a load of material in the bed of the truck.

On condition the total torque of motor 204 is greater than the threshold torque, controller 202 can also or alternatively lower an operating torque of rail pump 118 to reduce the risk of or prevent overloading of motor 204. Controller 202 can lower the operating torque of rail pump 222 by, for example, modulating the displacement of rail pump 222 and/or actuating rail valve 226 to lower the pressure of second hydraulic circuit 210. With the benefit of brake accumulator 230 and steering accumulator 234 and associated brake accumulator pressure sensor 232 and steering accumulator pressure sensor 236, additional control strategies are possible for managing the load of motor 204.

In an example, controller 202 is monitoring the pressure of brake accumulator 230 and steering accumulator 234 by receiving pressure signals from brake accumulator pressure sensor 232 and steering accumulator pressure sensor 236. On condition brake accumulator pressure sensor 232 or steering accumulator pressure sensor 236 indicates a pressure that is equal to or less than an accumulator low pressure threshold, controller 202 can communicate with rail pump controller 224 to actuate rail valve 226 to raise the pressure of second hydraulic circuit 210 to a high pressure set point. Raising the pressure of second hydraulic circuit 210 will cause rail pump 222 to drive to the high pressure set point and charge one or both of brake accumulator 230 and steering accumulator 234. After one or both of brake accumulator 230 and steering accumulator 234 have been charged and one or both of brake accumulator pressure sensor 232 and steering accumulator pressure sensor 236 indicate a pressure greater than the lower pressure threshold, controller 202 can revert to a low pressure set point for second hydraulic circuit via communication with rail pump controller 224 to actuate rail valve 226.

Examples according to this disclosure are directed to reducing the risk of or preventing overloading a motor employed to drive multiple hydraulic circuits/systems. As described in the foregoing examples, reducing the risk of or preventing overloading an electric motor driving first and second hydraulic circuits/systems can be implemented by controlling/limiting motor torque. However, it is also possible to limit the total power draw on the motor. Instead of controlling the motor by limiting total torque to a threshold torque, the total power of the motor, torque multiplied by rotational speed, can be limited to a threshold power.

For example, a controller can be configured to determine a current operating power of the motor based on torque signals from the motor controller and motor speed, e.g. measured by a speed sensor operatively connected to the motor. The controller could also estimate a power load on the motor from a pump of one of the hydraulic systems/circuits as a function of an estimated torque of the pump and a prescribed or estimated motor speed at which such torque is delivered. The total power on the motor can be estimated as the sum of the current operating power of the motor and the estimate of power load required by the pump, which estimated total power the controller can then compare to a threshold power that is set to reduce the risk of or prevent overloading the motor.

Controllers in accordance with examples of this disclosure, including controller(s) 102 and 202 can be included in or separate from a work machine. Examples according to this disclosure may include multiple controllers working in conjunction with each other to execute functions attributed to the controller(s). In examples, controller(s) can be part of or included in an electronic control unit ECU of the work machine.

Controller(s), ECUs, etc. included in examples according to this disclosure can be configured to communicate with one another and with other components of the work machine via various wired or wireless communications technologies and components using various public and/or proprietary standards and/or protocols. Examples of transport mediums and protocols for electronic communication between components of the work machine include Ethernet, Transmission Control Protocol/Internet Protocol (TCP/IP), IEEE 802.11 or Bluetooth, or other standard or proprietary transport mediums and communication protocols.

In some examples, controller(s) can be included in an ECU of the work machine. An electronic control unit (ECU) can be an embedded system that controls various aspects of machine operation. Types of ECUs include Electronic/Engine Control Module, Powertrain Control Module, Transmission Control Module, Brake Control Module, Suspension Control Module, among other examples. In the case of industrial, construction, and other heavy machinery, example ECUs can also include an Implement Control Module associated with one or more implements connected to and operable from the machine.

Work machines in accordance with examples of this disclosure may include, for example, an Engine Control Module (ECM), an Implement Control Module (ICM), a Transmission Control Module (TCM), and a Brake Control Module (BCM). These electronic modules/units can be communicatively connected and configured to send and receive data, sensor or other digital and/or analog signals, and other information between the various ECUs of machine 100. Additionally, functions attributed to an ECU or controller(s) 106, can be distributed among multiple devices.

Controller(s), whether onboard and/or separate from the work machine, can include software, hardware, and combinations of hardware and software configured to execute a number of functions attributed to the components in the disclosed examples. Such controllers in examples according to this disclosure can be an analog, digital, or combination analog and digital controller including a number of components. As examples, the controller(s) can include integrated circuit boards or ICB(s), printed circuit boards PCB(s), processor(s), data storage devices, switches, relays, etcetera. Examples of processors can include any one or more of a microprocessor, a controller, a digital signal processor (DSP), an application specific integrated circuit (ASIC), a field-programmable gate array (FPGA), or equivalent discrete or integrated logic circuitry.

Controller(s), ECUs and other electronic controls in examples according to this disclosure can include storage media to store and/or retrieve data or other information, for example, signals from sensors. Examples of non-volatile storage devices include magnetic hard discs, optical discs, floppy discs, flash memories, or forms of electrically programmable memories (EPROM) or electrically erasable and programmable (EEPROM) memories. Examples of volatile storage devices include random access memories (RAM), dynamic random access memories (DRAM), static random access memories (SRAM), and other forms of volatile storage devices. The data storage devices can be used to store program instructions for execution by processor(s) of, for example, the controller(s).

INDUSTRIAL APPLICABILITY

Figure 3:
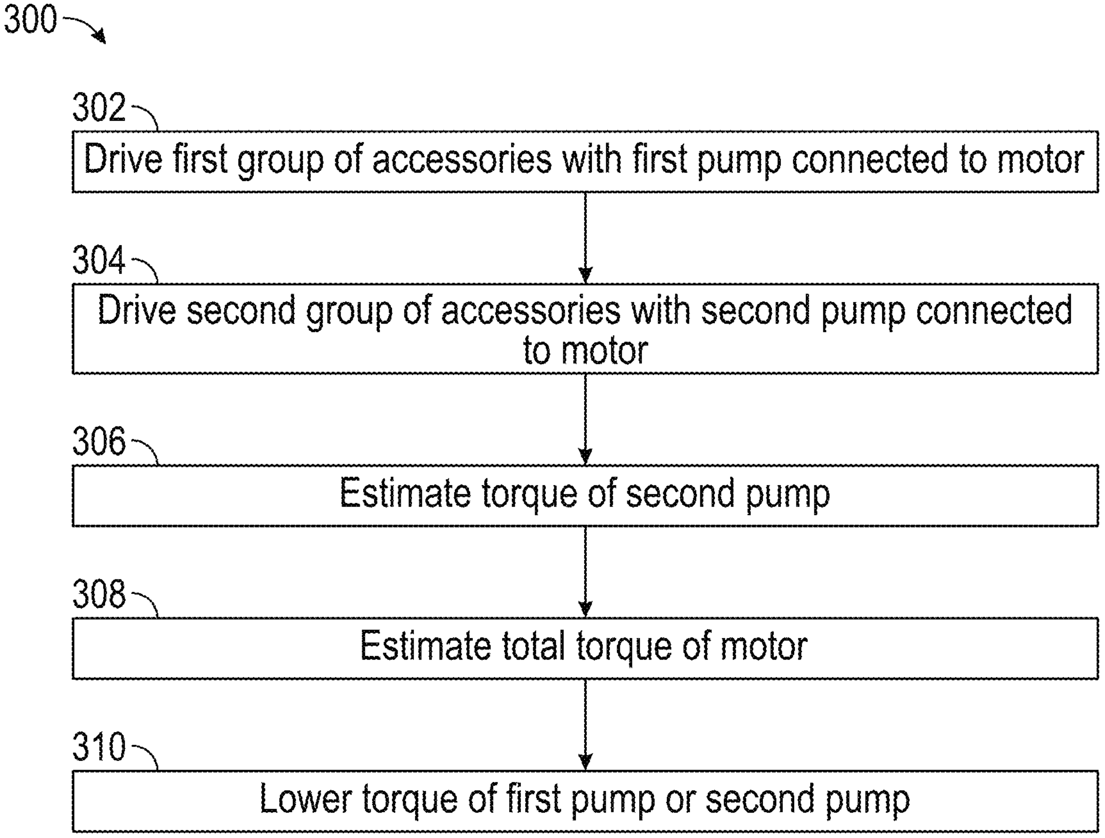
FIG. 3 is a flow chart depicting an example method in accordance with this disclosure.

FIG. 3 is a flowchart depicting example method 300 in accordance with this disclosure. Example method 300 includes driving a first group of one or more hydraulic accessories of a work machine with a first pump operatively connected to an electric motor (302), driving a second group of one or more hydraulic accessories of the work machine with a second pump motor operatively connected to the motor (304), estimating a torque of the second pump (306), estimating a total torque of the motor as a sum of a current operating torque of the motor and the estimate of the torque of the second pump (308), and on condition the total torque of the motor is greater than a threshold torque, lowering an operating torque of at least one of the first pump or the second pump (310).

In operation, a material hauler work machine with an articulating bed configured to carry and off-load various types of materials at a job site carries a load in this bed to a location at the job site. The material hauler can be, for example, substantially similar in structure and function to example work machine 200 of FIG. 2. Work machine 200 can have picked up the load of materials on or off-site. While carrying the material load to a dump/deposit location of the job site, work machine 200 may be operating one or both of the brake and steering systems. As such, as work machine 200 carries the load to the deposit location, controller 202 can periodically receive pressure sensor signals from, e.g., brake accumulator pressure sensor 232 and steering accumulator pressure sensor 236. On condition brake accumulator pressure sensor 232 or steering accumulator pressure sensor 236 indicates a pressure that is equal to or less than an accumulator low pressure threshold, controller 202 can communicate with rail pump controller 224 to actuate rail valve 226 to raise the pressure of second hydraulic circuit 210 to a high pressure set point. Raising the pressure of second hydraulic circuit 210 will cause rail pump 222 to drive to the high pressure set point and charge one or both of brake accumulator 230 and steering accumulator 234. After one or both of brake accumulator 230 and steering accumulator 234 have been charged and one or both of brake accumulator pressure sensor 232 and steering accumulator pressure sensor 236 indicate a pressure greater than the lower pressure threshold, controller 202 can revert to a low pressure set point for second hydraulic circuit via communication with rail pump controller 224 to actuate rail valve 226.

Simply carrying the load in the bed of work machine 200 (versus, e.g., raising the bed to deposit the load) may not require actuation of hoist cylinders 218, 220. In such circumstances, controller 202 can be periodically checking the total torque on motor 204 by estimating the torque on rail pump 222 and estimating the total torque on motor 204 as the sum of the estimate of torque on rail pump 222 and the current operating torque of motor 204.

Although carrying the load to the deposit location may not require actuation of hoist cylinders 218, 220, because motor 204 and hoist pumps 212, 214 have a direct drive connection, it may not be possible to simply deactivate hoist pumps 212, 214 to reduce the load on motor 204. Controller 202 can however derate the torque of hoist pumps 212, 214 by actuating hoist valve 216 into the hold state and thereby divert first hydraulic circuit to the low-pressure brake oil cooling accessory system, which will lower the torque on hoist pumps 212, 214 significantly relative to the torque required to raise, lower, and/or float the hoist cylinders 218, 220.

There may be operational circumstances in which work machine 200 needs to both actuate hoist cylinders 218, 220 to commence or continue to deposit the load and to steer and/or brake the machine. In such cases, controller 202 can employ control strategies in accordance with examples of this disclosure to reduce the risk of or prevent overloading motor 204. For example, in the case hoist cylinders 218, 220 are in a raise operation with a full load and work machine 200 needs to steer and/or brake the machine, controller 202 can estimate the torque of rail pump 222 as a function of the displacement of the pump and the pressure in second hydraulic circuit 210. In examples, controller 202 is monitoring pressure in second hydraulic circuit 210 by receiving signals indicative of valve and accumulator pressures from rail valve pressure sensor 228, brake accumulator pressure sensor 232, and steering accumulator pressure sensor 236. Controller 202 can reference a look-up table for rail pump 222 and second hydraulic circuit 210 stored in memory of controller 202 or another component and pressure sensor signals from one or more of rail valve pressure sensor 228, brake accumulator pressure sensor 232, and steering accumulator pressure sensor 236 to estimate the torque of rail pump.

Controller 202 can determine the operating torque of motor 204 by, for example, communicating with motor controller 206 and receiving signals indicating the current operating torque of the motor. Controller 102 can then estimate the total torque of motor 204 as a sum of the estimate of the torque of rail pump 222 and the current operating torque of motor 204, which can be equal to or indicative of the torque of hoist pumps 212, 214.

On condition the total torque of motor 204 is greater than the threshold torque, controller 202 can lower an operating torque of hoist pumps 212, 214 or rail pump 222 to reduce the risk of or prevent overloading of motor 204. As braking and steering of work machine 200 may be generally prioritized over use of hoist cylinders 218, 220, in operation, controller can lower the operating torque of hoist pumps 212, 214 to reduce the risk of or prevent overloading of motor 204. For example, controller 202 can actuate hoist valve 216 to the hold state. In the hold state, hoist valve 216 closes high-pressure branches 242 of first hydraulic circuit 208 between hoist valve 216 and hoist cylinders 218, 220, which maintains the pressure of and holds hoist cylinders 218, 220 (and associated material load in the articulating bed of material hauler work machine 200) in the current position. Additionally, in the hold state, hoist valve 216 opens low-pressure branch 244 of first hydraulic circuit 208, thereby diverting hydraulic fluid flow to a brake oil cooling system of work machine 200, which pressure load is significantly lower than the load generated by hoist cylinders 218, 220 with a load of material in the bed of the truck.

Lowering the torque of hoist pumps 212, 214 in this manner can have the effect of lowering the total torque on motor 204 below the threshold torque, and controller 202 can continue to monitor the load on motor 204. For example, as brake accumulator 230 and/or steering accumulator 234 become fully charged and/or as braking and steering are no longer required, controller 202 may estimate the total torque on motor as less than or equal to the threshold torque. In such a case, controller 202 may control hoist valve to actuate from the hold to the raise state, which will open high-pressure branches 242 and increase the pressure of first hydraulic circuit and cause an increased torque from hoist pumps 212, 214 to drive hoist cylinders 218, 220 to continue raising and thereby complete the deposit of the material load in the articulating bed of the material hauler work machine 200.

In the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific examples. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific examples. However, the benefits, advantages, solutions to problems, and any feature(s) that may cause any benefit, advantage, or solution to occur or become more pronounced are not to be construed as a critical, required, or essential feature of any or all the claims. Moreover, the particular examples disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular examples disclosed above may be altered or modified and all such variations are considered within the scope of the disclosed subject matter. Accordingly, the protection sought herein is as set forth in the claims below.

What is claimed is:

1. A work machine comprising:

a first hydraulic circuit comprising a first pump and a first valve, the first pump configured to drive a first group of one or more hydraulic accessories;

a second hydraulic circuit comprising a second pump and a variable pressure valve, the second pump configured to drive a second group of one or more hydraulic accessories;

a single electric motor operatively connected and configured to drive the first pump and the second pump; and a controller configured to:

estimate a torque of the second pump;

estimate a total torque of the motor as a sum of a current operating torque of the motor and the estimate of the torque of the second pump; and on condition the total torque of the motor is greater than a threshold torque, lower an operating torque of at least one of the first pump or the second pump.

2. The work machine of claim 1, wherein a maximum torque capability of the motor is less than a sum of a first torque required by the first pump to drive the first group of one or more hydraulic accessories and a second torque required by the second pump to drive the second group of one or more hydraulic accessories.

3. The work machine of claim 1, wherein the threshold torque is less than or equal to a maximum torque capability of the motor.

4. The work machine of claim 1, wherein the controller is configured to lower the operating torque of the second pump by controlling the variable pressure valve to lower the pressure of the second hydraulic circuit.

5. The work machine of claim 1, wherein the controller is configured to lower the operating torque of the first pump by actuating the first valve to divert the first hydraulic circuit from the first group of one or more hydraulic accessories to a low-pressure accessory driven at a pressure lower than pressures required by the first group of one or more hydraulic accessories.

6. The work machine of claim 1, wherein:

the first group of one or more hydraulic accessories comprises one or more hoist cylinders; and the first valve is configured to modulate pressure in the first hydraulic circuit by being actuated into one of a plurality of states.

7. The work machine of claim 6, wherein:

the plurality of states of the first valve comprises a hold state that closes a branch of the first hydraulic circuit between the one or more hoist cylinders and the first valve and directs flow through the first hydraulic circuit from the first pump to a low-pressure accessory driven at a pressure lower than pressures required by the one or more hoist cylinders with the first valve in any of the plurality of states other than the hold state; and the controller is configured to lower the operating torque of the first pump by actuating the first valve to the hold state.

8. The work machine of claim 1, wherein:

the second hydraulic circuit comprises an accumulator connected to the second hydraulic circuit and an accumulator pressure sensor configured to measure a pressure of the accumulator;

the second pump is configured to charge the accumulator to a high pressure set point; and the accumulator is configured to drive the second group of one or more hydraulic accessories for a limited time without being charged by the second pump.

9. The work machine of claim 8, wherein, on condition the accumulator pressure sensor indicates the accumulator pressure is greater than an accumulator low pressure threshold, the controller is configured to control the variable pressure valve to lower the pressure of the second hydraulic circuit to a low pressure set point.

10. The work machine of claim 9, wherein, on condition the accumulator pressure sensor indicates the accumulator pressure is equal to or less than the accumulator low pressure threshold, the controller is configured to control the variable pressure valve to increase the pressure of the second hydraulic circuit to the high pressure set point to cause the second pump to recharge the accumulator.

11. The work machine of claim 9, wherein:

the first group of one or more hydraulic accessories comprises one or more hoist cylinders;

the first valve is configured to modulate pressure in the first hydraulic circuit by being actuated into one of a plurality of states comprising a hold state that closes a branch of the first hydraulic circuit between the hoist cylinder and the first valve and directs flow through the first hydraulic circuit from the first pump to a low-pressure accessory driven at a pressure lower than pressures required by the one or more hoist cylinders with the first valve in any of the plurality of states other than the hold state; and on condition the accumulator pressure sensor indicates the accumulator pressure is equal to or less than the accumulator low pressure threshold, the controller is configured to determine that the first valve is in one of the plurality of states other than the hold state, control the variable pressure valve to increase the pressure of the second hydraulic circuit to the high pressure set point to cause the second pump to recharge the accumulator, and lower the operating torque of the first pump by actuating the first valve to the hold state.

12. The work machine of claim 1, wherein the second pump is a variable displacement pump.

13. The work machine of claim 12, wherein the controller is configured to estimate the torque of the variable displacement pump based on a pressure of the second hydraulic circuit and a displacement of the variable displacement pump.

14. The work machine of claim 1, wherein the controller is configured to lower the operating torque of the second pump by controlling the variable pressure valve to lower the pressure of the second hydraulic circuit.

15. The work machine of claim 1, wherein the motor is connected to the first pump and the second pump by a direct drive.

16. The work machine of claim 1, wherein the controller is configured to estimate the torque of the second pump based on at least one of a pressure of the second hydraulic circuit or a displacement of the second pump.

17. The work machine of claim 16, wherein the controller is configured to estimate the torque of the second pump by determining a pressure of the second hydraulic circuit and using a torque look-up table for the second pump including at least one of a pump efficiency factor, hydraulic fluid viscosity, and pump speed to provide an estimate of the torque of the second pump at the determined pressure of the second hydraulic circuit.

18. A method comprising:

driving a first group of one or more hydraulic accessories of a work machine with a first pump operatively connected to an electric motor;

driving a second group of one or more hydraulic accessories of the work machine with a second pump motor operatively connected to the motor;

estimating a torque of the second pump;

estimating a total torque of the motor as a sum of a current operating torque of the motor and the estimate of the torque of the second pump; and on condition the total torque of the motor is greater than a threshold torque, lowering an operating torque of at least one of the first pump or the second pump.

19. A work machine comprising:

a first hydraulic circuit including a first pump configured to drive a first group of one or more hydraulic accessories of the work machine;

a second hydraulic circuit comprising a second pump configured to drive a second group of one or more hydraulic accessories of the work machine;

a single electric motor operatively connected and configured to drive the first pump and the second pump; and a controller configured to:

estimate a total torque of the motor;

compare the total torque to a threshold torque; and on condition the total torque is greater than the threshold torque, lower an operating torque of at least one of the first pump or the second pump.

20. The work machine of claim 19, wherein a maximum torque capability of the motor is less than a sum of a first torque required by the first pump to drive the first group of one or more hydraulic accessories and a second torque required by the second pump to drive the second group of one or more hydraulic accessories.

* * * * *